United States Patent
Schulz

(10) Patent No.: US 6,242,524 B1
(45) Date of Patent: *Jun. 5, 2001

(54) BINDER FOR NON-WOVEN FABRIC

(75) Inventor: Gerald Owen Schulz, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/324,184

(22) Filed: Jun. 2, 1999

(51) Int. Cl.⁷ .................................................. C08J 51/00
(52) U.S. Cl. ........................ 524/505; 524/416; 524/423; 524/500
(58) Field of Search .................................. 524/378, 416, 524/500, 505, 423; 252/608, 609; 525/409, 419

(56) References Cited

U.S. PATENT DOCUMENTS

| | | | |
|---|---|---|---|
| 2,036,854 | 4/1936 | Dickie et al. | 91/68 |
| 2,452,054 | 10/1948 | Jones et al. | 260/17.3 |
| 2,917,476 | * 12/1959 | Peterson et al. | 260/17.4 |
| 3,061,492 | 10/1962 | Singleton et al. | 154/43 |
| 3,840,488 | 10/1974 | Steinwand | 260/29.7 |
| 4,239,670 | 12/1980 | Moorman | 260/29.6 |
| 5,004,562 | * 4/1991 | Kissel | 252/518 |
| 5,302,249 | * 4/1994 | Malhotra et al. | 162/135 |
| 5,484,839 | 1/1996 | Wang et al. | 524/533 |
| 5,733,964 | * 3/1998 | Johnston et al. | 524/505 |
| 5,859,121 | * 1/1999 | Brandriff | 524/505 |

* cited by examiner

Primary Examiner—Edward J. Cain
Assistant Examiner—Katarzyna Wyrozebski-Lee
(74) Attorney, Agent, or Firm—Alvin T. Rockhill

(57) ABSTRACT

This invention relates to fire retardant latex binders for non-woven fabrics. Non-woven fabrics can be manufactured using the fire retardant latex binder formulations of this invention using cotton fibers, polyester fibers, rayon fibers, nylon fibbers, cellulosic fibers. The fire retardant latex binders of this invention are particularly useful in manufacturing fiber glass furnace filters. The fire retardant latex binders of this invention are comprised of (1) water, (2) a styrene-butadiene rubber, (3) a fatty acid soap, (4) a sulfonate surfactant, (5) an ethylene oxide/propylene oxide/ethylene oxide triblock polymer, wherein the ethylene oxide/propylene oxide/ethylene oxide triblock polymer has a number average molecular weight of at least 8000, and (6) about 10 phr to about 50 phr of diammonium phosphate.

18 Claims, No Drawings

BINDER FOR NON-WOVEN FABRIC

FIELD OF THE INVENTION

This invention relates to fire-retardant latices which are useful as binders for manufacturing non-woven fabrics. The fire-retardant latex binders of this invention are particularly useful in manufacturing non-woven fiberglass furnace filters.

BACKGROUND OF THE INVENTION

Various latex compositions can be used as binders for non-woven fabrics. In many applications, it is desirable for the latex binder composition to provide fire-retardant characteristics. For instance, in clothing and household applications, it is normally desirable for the latex employed to contain a fire-retardant material.

A wide variety of chemical agents can be used in latex binders as fire-retardants. For instance, tris-(2,3-dibromopropyl) phosphate was once widely used as a flame-retardant in manufacturing children's sleepwear. However, tris-(2,3-dibromopropyl) phosphate is no longer used in such applications because testing has showed that it might be carcinogenic. Other flame-retardant compounds that have been developed to replace tris-(2,3-dibromopropyl) phosphate include tris(1,3-dichloroisopropyl) phosphate and a mixture of two cyclic phosphonate esters.

U.S. Pat. No. 2,036,854 discloses that a mixture of ammonium borate or phosphate with an ammonium halide, such as ammonium bromide, is useful for flame-proofing textile materials. U.S. Pat. No. 2,036,854 further reports that the ammonium halide appears to greatly enhance the flame-extinguishing properties of the ammonium borate or phosphate.

U.S. Pat. No. 2,452,054 discloses the use of diammonium phosphate and ammonium bromide as a flame-retardant for use on cellulosic materials. It is further disclosed in U.S. Pat. No. 3,061,492 that ammonium bromide can be used as a flame-retardant for unsaturated polyester resin compositions.

U.S. Pat. No. 3,840,488 discloses the use of ammonium bromide and urea as flame-retardant additives for styrene-butadiene rubber (SBR) latex that is used for textile treatment and carpet backing applications. However, U.S. Pat. No. 3,840,488 further discloses that the utilization of ammonium bromide and urea in such latices has the undesirable effect of reducing the viscosity of the latex. The teachings of U.S. Pat. No. 3,840,488 further indicate that this undesirable decrease in the viscosity of the latex can be prevented by the addition of a halo alkyl phosphoric acid or salt.

U.S. Pat. No. 5,484,839 discloses a flame-retardant natural or synthetic latex which is grafted with ring-halogenated, ethylenically unsaturated aromatic monomers. These grafted latex compositions are reported to be useful as non-woven filter media binders, as backcoatings for woven upholstery and draperies, and in other applications.

U.S. Pat. No. 4,239,670 appreciates the fact that the addition of some flame-retardant materials, such as diammonium phosphate, to latex can cause the latex to become unstable. U.S. Pat. No. 4,239,670 further notes that such instability can render the latex unsuitable for its intended purpose. U.S. Pat. No. 4,239,670 solves the problem of latex instability caused by the addition of diammonium phosphate by further adding one part by weight of ammonium bromide per part by weight of diammonium phosphate added to the latex.

SUMMARY OF THE INVENTION

It has been unexpectedly found that the stability of styrene-butadiene rubber latices containing diammonium phosphate can be significantly improved by adding from 0.1 phr (parts per 100 parts by weight of dry rubber) to 5 phr of a sulfonate surfactant and 0.1 phr to 4 phr of an ethylene oxide/propylene oxide/ethylene oxide triblock polymer nonionic surfactant thereto. By utilizing this technique fire-retardant latex binder compositions containing diammonium phosphate can be made without the need to add ammonium bromide to attain a satisfactory level of stability. Since diammonium phosphate can be included in the latex composition, it is not necessary to graft a ring-halogenated, ethylenically unsaturated aromatic monomer onto the latex composition to render it fire-retardant.

The present invention specifically discloses a fire-retardant latex binder composition which is comprised of (1) water, (2) a styrene-butadiene rubber, (3) a fatty acid soap, (4) a sulfonate surfactant, (5) an ethylene oxide/propylene oxide/ethylene oxide triblock polymer, wherein the ethylene oxide/propylene oxide/ethylene oxide triblock polymer has a number average molecular weight of at least 8000, and (6) about 10 phr to about 50 phr of diammonium phosphate. This fire-retardant latex binder composition is particularly useful as a binder for manufacturing non-woven fabric.

The present invention further discloses a process for manufacturing a furnace filter which comprises (I) applying a fire-retardant latex binder composition to a fiberglass matrix to produce a latex-coated fiberglass matrix, wherein the fire-retardant latex binder composition is comprised of (1) water, (2) a styrene-butadiene rubber, (3) a fatty acid soap, (4) a sulfonate surfactant, (5) an ethylene oxide/propylene oxide/ethylene oxide triblock polymer, wherein the ethylene oxide/propylene oxide/ethylene oxide triblock polymer has a number average molecular weight of at least 8000, and (6) about 10 phr to about 50 phr of diammonium phosphate, and (II) drying the latex coated fiberglass matrix to produce the furnace filter.

DETAILED DESCRIPTION OF THE INVENTION

The fire-retardant latex binder compositions of this invention are made by simply mixing about 10 phr (parts per hundred parts by weight of rubber) to about 50 phr of diammonium phosphate into a styrene-butadiene latex that contains a fatty acid soap, a sulfonate surfactant and an ethylene oxide/propylene oxide/ethylene oxide triblock polymer, wherein the ethylene oxide/propylene oxide/ethylene oxide triblock polymer has a number average molecular weight of at least 8000. Such a latex is manufactured and sold by The Goodyear Tire & Rubber Company under the name Pliolite® 5000C. In most cases, from about 15 phr to about 40 phr of diammonium phosphate will be mixed into the latex.

Such styrene-butadiene rubbers in the latex is comprised of repeat units which are derived from styrene monomer and 1,3-butadiene rubber. Such styrene-butadiene rubbers will typically be comprised of repeat units which are derived from about 1 to about 40 weight percent styrene and about 60 to about 99 weight percent butadiene. The styrene-butadiene rubber in the latex will typically contain from about 10 weight percent to about 30 styrene and from about 70 weight percent to about 90 weight percent butadiene. The styrene-butadiene rubber in the latex will more preferably contain about 15 weight percent to about 25 weight percent styrene and from about 75 weight percent to about 85 weight percent butadiene.

The styrene-butadiene rubber latex can be synthesized using a fatty acid soap system and conventional emulsion polymerization techniques. Such emulsion polymerizations generally utilize a charge composition which is comprised of water, styrene monomer, 1,3-butadiene monomer, an initiator and a fatty acid soap. Such polymerizations can be conducted over a very wide temperature range from about 0° C. to as high as about 100° C. Such emulsion polymerizations are typically conducted at a temperature which is within the range of about 5° C. to about 60° C.

The fatty acid soap used in such polymerizations may be charged at the outset of the polymerization or may be added incrementally or proportionately as the reaction proceeds. Normally, from about 2 phm (parts by weight per 100 parts by weight of monomer) to about 7 phm of the fatty acid soap will be charged into the polymerization medium. It is typically preferred for the polymerization medium to contain from about 4 phm to about 6 phm of the fatty acid soap.

The emulsion polymerizations used in synthesizing the styrene-butadiene rubber latex may be initiated using free radical catalysts, ultraviolet light or radiation. To insure a satisfactory polymerization rate, uniformity and a controllable polymerization, free radical initiators are virtually always used to initiate such emulsion polymerizations. Free radical initiators which are commonly used include the various peroxygen compounds such as potassium persulfate, ammonium persulfate, benzoyl peroxide, hydrogen peroxide, di-t-butylperoxide, dicumyl peroxide, 2,4-dichlorobenzoyl peroxide, decanoyl peroxide, lauroyl peroxide, cumene hydroperoxide, p-menthane hydroperoxide, t-butylhydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy) cyclohexane, and the like.

The emulsion polymerization system used in the synthesis of the latex can be treated at the desired degree of conversion with shortstopping agents, such as hydroquinone or a combination of the sodium salt of N,N-dimethyl dithiocarbamate with N,N-diethyl hydroxylamine. Typical stabilizing agents and standard antioxidants can also be added to the latex.

In accordance with this invention, from about 0.1 phr to 5 phr of a sulfonate surfactant and from about 0.1 phr to about 4 phr of an ethylene oxide/propylene oxide/ethylene oxide block terpolymer will be added latex. It is typically preferred to add 1 phr to 3 phr of the sulfonate surfactant and 0.4 phr to 2 phr of the ethylene oxide/propylene oxide/ethylene oxide block terpolymer to the styrene-butadiene latex. It is typically more preferred to add 1.5 phr to 2.5 phr of the sulfonate surfactant and 0.8 phr to 1.2 phr of the ethylene oxide/propylene oxide/ethylene oxide block terpolymer to the styrene-butadiene latex.

Some representative examples of sulfonate surfactants that can be employed include: alkane sulfonates, esters and salts (such as alkylchlorosulfonates) and alkylsulfonates with the general formula:

wherein R is an alkyl group having from 1 to 20 carbon atoms; sulfonates with intermediate linkages such as ester and ester-linked sulfonates such as those having the formula:

and

wherein R is an alkyl group having from 1 to 20 carbon atoms such as dialkyl sulfosuccinates; ester salts with the general formula:

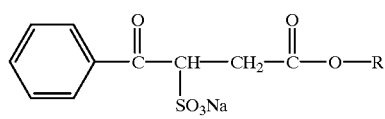

wherein R is an alkyl group having from 1 to 20 carbon atoms, alkarylsulfonates in which the alkyl groups contain preferably from 10 to 20 carbon atoms (e.g., dodecylbenzenesulfonates, such as sodium dodecylbenzenesulfonate) and alkyl phenol sulfonates.

Disulfonated surfactants having the structural formula:

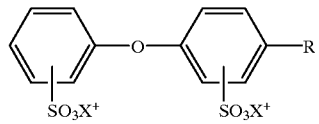

wherein R represents a linear or branched alkyl group containing from about 6 to about 16 carbon atoms and wherein X represents a metal ion, such as a sodium ion, have proven to be excellent surfactants for making the latex used in the practice of this invention. Such surfactants are sold by The Dow Chemical Company as Dowfax™ anionic surfactants.

The ethylene oxide/propylene oxide/ethylene oxide triblock polymers that can be used are of the structural formula:

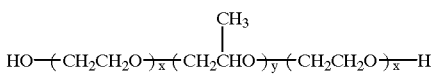

These triblock polymers will typically have a number average molecular weight of at least 8000. The triblock polymer will typically have a number average molecular weight which is within the range of about 10,000 to about 20,000. It is normally preferred for the triblock polymer to have a number average molecular weight which is within the range of 10,500 to 16,000. It is typically more preferred for the triblock polymer to have a number average molecular weight which is within the range of 11,000 to 14,000.

The polyoxypropylene block in the triblock polymer will typically have a number average molecular weight which is within the range of about 2,000 to about 12,000 and will more typically have a number average molecular weight which is within the range of 2,500 to 8,000. The polyoxypropylene block in the triblock polymer will preferably have a number average molecular weight which is within the range of 3,000 to 6,000. The polyoxypropylene block in the triblock polymer will more preferably have a number average molecular weight which is within the range of 3,500 to 4,500.

The polyoxyethylene blocks in the triblock polymer will typically comprise 50 weight percent to 90 weight percent of the total weight of the triblock polymer (the polyoxypropylene blocks will, of course, comprise the remaining 10 weight percent to 50 weight percent of the triblock polymer). The polyoxyethylene blocks in the triblock polymer will preferably comprise 60 weight percent to 80 weight percent of the total weight of the triblock polymer with the polyoxypropylene blocks comprising the remaining 20 weight percent to 40 weight percent of the triblock polymer. The polyoxyethylene blocks in the triblock polymer will preferably comprise 70 weight percent to 75 weight percent of the total weight of the triblock polymer with the polyoxypropylene blocks comprising the remaining 25 weight percent to 30 weight percent of the triblock polymer. It is preferred for the triblock polymer to have a HLB (hydrophilic/lipophilic balance) number which is within the range of about 18 to about 26. It is more preferred for the triblock polymer to have a HLB number which is within the range of 18 to 23. Pluronic® F108 surfactant and Pluronic® F127F surfactant are representative examples of ethylene oxide/propylene oxide/ethylene oxide triblock polymers that can be used in making the fire-retardant latex binder compositions of this invention.

The fire-retardant latex binder compositions of this invention can be employed as a binder for manufacturing a wide variety of non-woven fabrics. For example, non-woven fabrics can be manufactured using the fire retardant latex binder formulations of this invention using cotton fibers, polyester fibers, rayon fibers, nylon fibers, cellulosic fibers, fiber glass or various mixtures of such fibers. The fire retardant latex binders of this invention are particularly useful in manufacturing fiber glass furnace filters.

The fire-retardant latex binder compositions of this invention can be applied to substrates in manufacturing non-woven fabrics using any method known in the art. For instance, the fire-retardant latex binder composition can be applied to unwoven substrate fibers by kiss rolling, knife coating, airless spray or padding. Irrespective of which method of application is used, the latex binder which has been applied to the fibers needs to be dried or cured. This drying step is normally conducted by heating the fibers at an elevated temperature for a short period of time which is sufficient to effect drying and a proper cure. The temperature used in the drying step will typically be within the range of about 80° C. to about 160° C. and will more typically be within the range of about 110° C. to about 140° C.

Fiberglass is typically used in manufacturing furnace filters since the fiber can experience high temperatures during periods of its normal service life. In manufacturing such furnace filters, the fire-retardant latex binder is normally sprayed onto a fiberglass matrix of the desired size and shape. The binder will be applied at a level which is sufficient to penetrate the fiberglass matrix. After the binder has been applied to the fiberglass matrix, the latex-coated matrix is dried using a conventional procedure. For instance, dry air can be circulated through the latex-coated fiberglass matrix at an elevated temperature which is within the range of about 100° C. to about 150° C.

This invention is illustrated by the following examples which are merely for the purpose of llustration and are not to be regarded as limiting the scope of the invention or the manner in which it can be practiced. Unless specifically indicated otherwise, parts and percentages are given by weight.

COMPARATIVE EXAMPLE 1

In this experiment, 20 phr of diammonium phosphate was added to a bottle of Pliolite® 5356 styrene-butadiene rubber latex that had previously been diluted with water to a solids content of about 33 percent. The Pliolite® 5356 styrene-butadiene latex used was emulsified with a fatty acid soap, had a bound styrene content of about 23.5 percent, an original solids content of about 70 percent, a Brookfield viscosity of about 1400 cps and had a Mooney viscosity of 100. However, upon the addition of the diammonium phosphate, the latex became unstable and coagulated.

EXAMPLE 2

In this experiment, 2 phr of Dowfax® 8390 sulfonate surfactant and 1 phr of Pluronic® F127P polyoxyethylene-polyoxypropylene-polyoxyethylene nonionic surfactant was added to Pliolite® 8390 styrene-butadiene rubber latex. Then, 20 phr of diammonium phosphate was added to the latex. The latex remained stable and coagulation did not occur.

EXAMPLE 3

In this experiment, 2 phr of Dowfax® 8390 sulfonate surfactant and 1 phr of Pluronic® F127P polyoxyethylene-polyoxypropylene-polyoxyethylene nonionic surfactant was added to Pliolite® 8390 styrene-butadiene rubber latex. Then, 40 phr of diammonium phosphate was added to the latex. The latex remained stable and coagulation did not occur. This experiment shows that the addition of the combination of the sulfonate surfactant and the polyoxyethylene-polyoxypropylene-polyoxyethylene nonionic surfactant caused the latex to remain stable even in the case where the diammonium phosphate was added at a very high level.

EXAMPLE 4

A fire-retardant latex binder composition can be made by mixing 25 phr of diammonium phosphate into Pliolite® 5000C styrene-butadiene rubber latex. Then, a non-woven polyester sheet can be manufactured by first passing loose polyester fibers through a garnet sizer and then spraying the non-woven polyester sheet produced in the garnet sizer with the latex containing the diammonium phosphate. Then, the wet non-woven polyester sheet can be slowly passed through an oven at a temperature of 300° F. (149° C.). The dried bonded fiber can then be rolled and packaged.

EXAMPLE 5

In this example, one liter of Pliolite® 5000C styrene-butadiene latex is diluted with 4 liters of water and 25 phr of diammonium phosphate is added to the diluted latex. The diluted latex solution is then mixed with cellulose paper fiber for application to a substrate. Typically, the mixture is applied to walls or ceilings as insulation. The latex and cellulose can be applied to any suitable substrate by using a sprayer. The substrate coated with 2–5 cm of insulation coating can then be left to dry at room temperature over a period of about 3 to 7 days. This technique is known as the "cellulose fiber method."

EXAMPLE 6

A fire-retardant latex binder composition can be made by mixing 40 phr of diammonium phosphate into Pliolite® 5000C styrene-butadiene rubber latex. The fire-retardant latex binder composition can then be used in manufacturing furnace filters. In such a procedure, a fiberglass furnace filter matrix of the desired size and shape is prepared. Then, the latex binder composition can be applied with a fly sprayer onto both sides on the non-woven fiberglass matrix at a level of about 25 weight percent (dry weight). Then, the latex binder coated fiberglass matrix is dried by passing it through an oven dryer that is maintained at a temperature of about 150° C. The furnace filters produced by this technique will have outstanding fire-retardant capacity.

While certain representative embodiments and details have been shown for the purpose of illustrating the subject invention, it will be apparent to those skilled in this art that various changes and modifications can be made therein without departing from the scope of the subject invention.

What is claimed is:

1. A fire-retardant latex binder composition which is comprised of (1) water, (2) a styrene-butadiene rubber, (3) a fatty acid soap, (4) a sulfonate surfactant, (5) an ethylene oxide/propylene oxide/ethylene oxide triblock polymer, wherein the ethylene oxide/propylene oxide/ethylene oxide triblock polymer has a number average molecular weight of at least 8000, and (6) about 10 phr to about 50 phr of diammonium phosphate.

2. A fire-retardant latex binder composition as specified in claim 1 wherein the sulfonate surfactant is present at a level which is within the range of about 0.1 phr to about 5 phr, and wherein the ethylene oxide/propylene oxide/ethylene oxide triblock polymer is present at a level which is within the range of about 0.1 phr to about 4 phr.

3. A fire-retardant latex binder composition as specified in claim 2 wherein the latex binder composition contains from about 2 phr to about 7 phr of the fatty acid soap.

4. A fire-retardant latex binder composition as specified in claim 3 wherein the styrene-butadiene rubber contains repeat units that are derived from about 10 weight percent to about 30 weight percent styrene and from about 70 weight percent to about 90 weight percent 1,3-butadiene.

5. A fire-retardant latex binder composition as specified in claim 4 wherein the ethylene oxide/propylene oxide/ethylene oxide triblock polymer has a propylene oxide block that has a number average molecular weight which is within the range of 2,000 to 12,000.

6. A fire-retardant latex binder composition as specified in claim 5 wherein propylene oxide block in the ethylene oxide/propylene oxide/ethylene oxide triblock polymer has a molecular weight that represents from 10 weight percent to 50 weight percent of the total molecular weight of the triblock polymer.

7. A fire-retardant latex binder composition as specified in claim 6 wherein the sulfonate surfactant is present at a level which is within the range of about 1 phr to about 3 phr, and wherein the ethylene oxide/propylene oxide/ethylene oxide triblock polymer is present at a level which is within the range of about 0.4 phr to about 2 phr.

8. A fire-retardant latex binder composition as specified in claim 7 wherein the latex contains from about 4 phr to about 6 phr of the fatty acid soap.

9. A fire-retardant latex binder composition as specified in claim 8 wherein the ethylene oxide/propylene oxide/ethylene oxide triblock polymer has a number average molecular weight which is within the range of 10,000 to 20,000.

10. A fire-retardant latex binder composition as specified in claim 9 wherein the ethylene oxide/propylene oxide/ethylene oxide triblock polymer has a propylene oxide block that has a number average molecular weight which is within the range of 2,500 to 8,000.

11. A fire-retardant latex binder composition as specified in claim 10 wherein propylene oxide block in the ethylene oxide/propylene oxide/ethylene oxide triblock polymer has a molecular weight that represents from 20 weight percent to 40 weight percent of the total molecular weight of the triblock polymer.

12. A fire-retardant latex binder composition as specified in claim 11 wherein the diammonium phosphate is present at a level which is within the range of about 15 phr to about 40 phr.

13. A fire-retardant latex binder composition as specified in claim 12 wherein the sulfonate surfactant is present at a level which is within the range of about 1.5 phr to about 2.5 phr, and wherein the ethylene oxide/propylene oxide/ethylene oxide triblock polymer is present at a level which is within the range of about 0.8 phr to about 1.2 phr.

14. A fire-retardant latex binder composition as specified in claim 13 wherein the ethylene oxide/propylene oxide/ethylene oxide triblock polymer has a number average molecular weight which is within the range of 10,500 to 16,000.

15. A fire-retardant latex binder composition as specified in claim 14 wherein the ethylene oxide/propylene oxide/ethylene oxide triblock polymer has a propylene oxide block that has a number average molecular weight which is within the range of 3,000 to 6,000.

16. A fire-retardant latex binder composition as specified in claim 15 wherein the ethylene oxide/propylene oxide/ethylene oxide triblock polymer has a number average molecular weight which is within the range of 11,000 to 14,000.

17. A fire-retardant latex binder composition as specified in claim 16 wherein propylene oxide block in the ethylene oxide/propylene oxide/ethylene oxide triblock polymer has a molecular weight that represents from 25 weight percent to 30 weight percent of the total molecular weight of the triblock polymer.

18. A fire-retardant latex binder composition as specified in claim 16 wherein the styrene-butadiene rubber contains repeat units that are derived from about 15 weight percent to about 25 weight percent styrene and from about 75 weight percent to about 85 weight percent 1,3-butadiene.

\* \* \* \* \*